Figure 1:
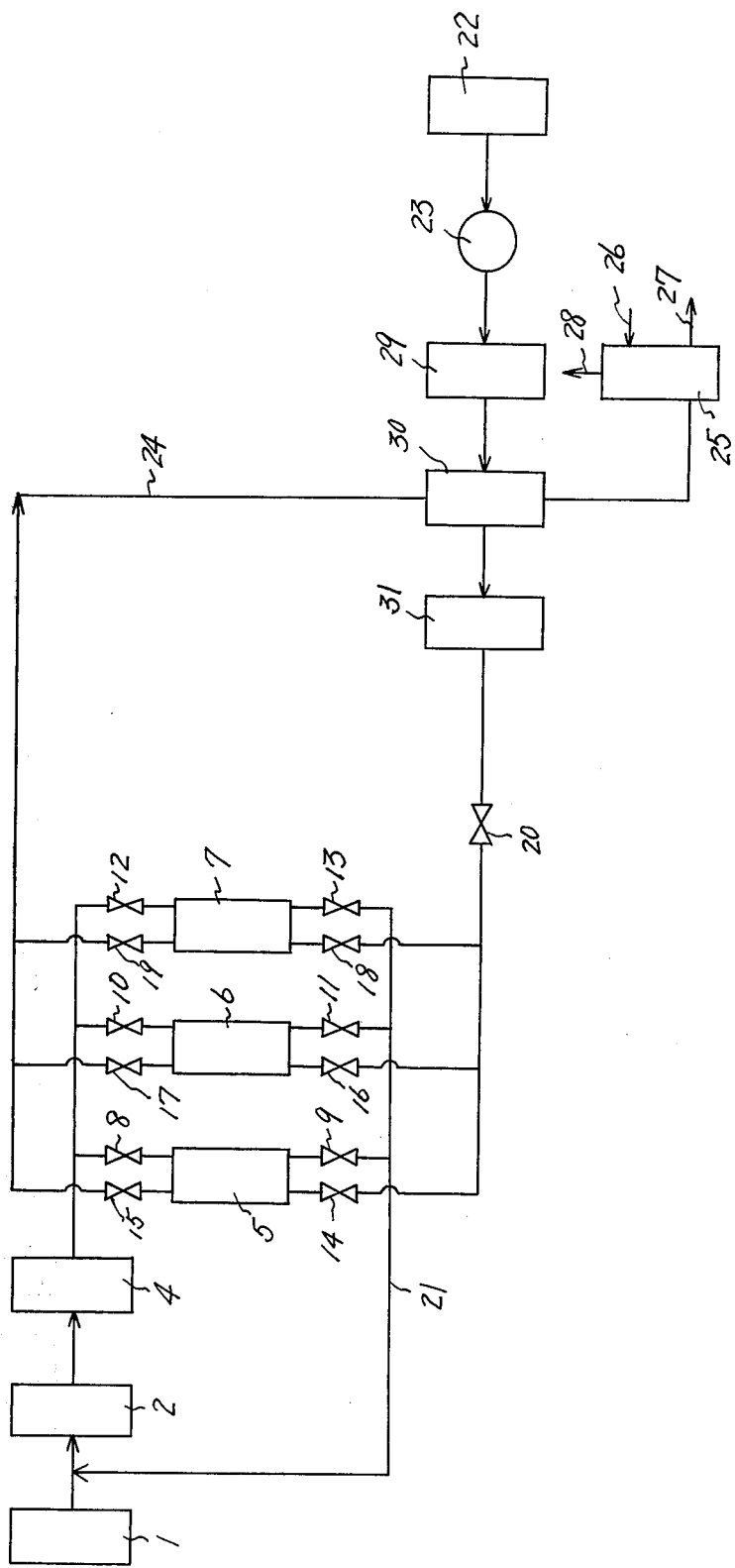

United States Patent [19]

Sakamoto et al.

[11] 4,136,027
[45] Jan. 23, 1979

[54] METHOD FOR TREATING WATER

[75] Inventors: Yusuke Sakamoto; Munetaka Kinugasa, both of Osaka; Shigeki Endo, Sakai; Mituo Yamane, Osaka; Shigeyoshi Fujie, Kishiwada, all of Japan

[73] Assignee: Osaka Gas Company Limited, Osaka, Japan

[21] Appl. No.: 802,541

[22] Filed: Jun. 1, 1977

Related U.S. Application Data

[63] Continuation of Ser. No. 628,317, Nov. 3, 1975, abandoned, which is a continuation-in-part of Ser. No. 581,279, May 27, 1975, abandoned, which is a continuation of Ser. No. 398,796, Sep. 19, 1973, abandoned.

[30] Foreign Application Priority Data

Sep. 22, 1972 [JP] Japan .................... 47-95706

[51] Int. Cl.² ............................ C02B 1/38
[52] U.S. Cl. .................... 210/63 Z; 204/176
[58] Field of Search ............ 210/63 Z, 192; 204/176

[56] References Cited

U.S. PATENT DOCUMENTS

| | | | |
|---|---|---|---|
| 2,782,397 | 2/1959 | Kiffer | 204/176 |
| 3,326,747 | 6/1967 | Ryan et al. | 210/63 Z |
| 3,748,262 | 7/1973 | Lee et al. | 210/63 Z |
| 3,779,909 | 12/1973 | Wisfeld et al. | 210/40 |

*Primary Examiner*—Thomas G. Wyse
*Attorney, Agent, or Firm*—Larson, Taylor and Hinds

[57] ABSTRACT

A method of treating water with ozone comprising:

(1) generating ozone from oxygen by an ozone generator, (2) supplying the resulting ozone-containing gas to at least three silica gel-packed adsorption towers one after another to cause the silica gel to adsorb ozone selectively from the gas while recycling discharged gas from the adsorption tower to the ozone generator, the adsorption tower being maintained at a temperature of −180° to 10° C, the silica gel containing a heavy metal in an amount of not greater than 1.0% by weight, (3) supplying a carrier gas to the adsorbed ozone-containing adsorption towers one after another at a pressure not higher than the pressure applied for the adsorption of ozone but not lower than the pressure at which the concentration of ozone in the carrier gas flowing out from the tower will be 20% by weight so as to desorb the ozone from the silica gel, (4) introducing oxygen into the deozonized adsorption towers one after another from one of the towers which has completed adsorption so as to purge away the carrier gas from the deozonized adsorption tower and a line extending therefrom, and (5) contacting the ozone-containing carrier gas discharged from the adsorption towers with the water to be treated.

1 Claim, 2 Drawing Figures

METHOD FOR TREATING WATER

This application is a continuation of Ser. No. 628,317, filed Nov. 3, 1975, abandoned; which is a continuation-in-part of application Ser. No. 581,279 filed May 27, 1975, now abandoned; and said application is a continuation of application Ser. No. 398,796 filed Sept. 19, 1973, now abandoned.

This invention relates to a method for treating water with ozone produced from oxygen.

Due to deterioration of quality of water sources for waterworks in recent years, there is a growing tendency that tap water may be no longer available by the conventional treatment involving sedimentation, filtration and disinfection. In fact, the conventional method of water treatment can not remove metal ions and like solubles from water and is ineffective in eliminating various odors attributable to the presence of molds or the like in water. In addition, more stringent standards will be set for the discharge of industrial waste water and sewage (hereinafter referred to briefly as "waste water"), especially for the regulation of the color, smell and the like of the waste water. When processed only by primary and secondary treatments including the steps of sedimentation, neutralization and dilution, waste water may possibly fail to meet the allowable standards, therefore.

An attempt has been made to decompose various water-solubles and to deodorize and decolorize water by a method in which ozone having high oxidizing ability and decomposable to harmless oxygen is blown into water processed by the conventional water treatments. This method has achieved satisfactory results on an experimental scale.

Generally, ozone is produced from air by silent electric discharge, using an ozone generator. However this method gives ozone in a very low concentration and involves a very great power requirement due to the presence of nitrogen in a predominant amount in air. The ozone obtained is therefore very expensive and consequently renders the water treatment very costly. For this reason, the ozone prepared from air has not been used widely for the treatment of water on an industrial scale. It has been proposed to produce ozone from oxygen or a gas having a high oxygen concentration than air by employing an ozone generator of silent electric discharge type (U.S. Pat. No. 2,872,379). The proposed method gives ozone in a concentration of up to about twice as high that of ozone produced from air, so that the method has the advantage of employing a smaller ozone generator and greatly reducing the power consumption per unit amount of ozone generated. However, even with the use of almost pure oxygen as the material, the resultant gas predominantly comprises oxygen with its ozone concentration limited to about 2 to 3%, if highest. When the gas is introduced into the water to be treated, the amount of ozone absorbed by the water is invariably not greater than such amount that corresponds to the partial pressure of ozone in the gas. This leads to a low water treating efficiency. Moreover, a major portion of the oxygen will be released to the atmosphere and wasted. According to U.S. Pat. No. 2,872,397, an ozone-containing gas is passed through one tower after another which towers are packed with silica gel to cause the silica gel to selectively adsorb ozone and air serving as a carrier gas is thereafter similarly passed through the towers to continually obtain a gas containing ozone. With this metod, the oxygen gas separated from ozone by the selective adsorption of the latter within the towers is recycled to an ozonizer. However, if the air serving as carrier gas remains in the towers, the nitrogen concentration of the recycle oxygen increases, consequently making the ozone produced costly as is the case with the ozone prepared from air. Accordingly, there is the necessity of purging the towers of air with a large amount of oxygen after the desorption of ozone before the adsorption of ozone for the next cycle of operation. Thus the ozone prepared is not usable for the treatment of water on an industrial scale because of the economical reason that the method involves great oxygen losses. To reduce such oxygen losses, U.S. Pat. No. 2,872,397 discloses a so-called vacuum purging method in which ozone is desorbed from the adsorption tower at a greatly reduced pressure without using a carrier gas. Although ozone can be obtained at a high concentration, this method has problems in respect of the resistance of the apparatus to vacuum and ozone, the stability of operation and safety. For this reason, the ozone prepared from air or a gas having a higher oxygen concentration than air is not widely used for treating water inexpensively on an industrial scale.

Accordingly, a main object of this invention is to provide a method for treating water on an industrial scale with a high efficiency using ozone produced from oxygen while recycling the oxygen effectively.

Other objects and features of this invention will become apparent from the following description.

The present invention provides a method for treating water with ozone comprising:

(1) generating ozone from oxygen by an ozone generator, (2) supplying the resulting ozone-containing gas to at least three silica gel-packed adsorption towers one after another to cause the silica gel to adsorb ozone selectively from the gas while recycling discharged gas from the adsorption tower to the ozone generator, the adsorption tower being maintained at a temperature of $-180°$ C. to $10°$ C., the silica gel containing a heavy metal in an amount of not greater than 1.0% by weight, (3) supplying a carrier gas to the adsorbed ozone-containing adsorption towers one after another at a pressure not higher than the pressure applied for the adsorption of ozone but not lower than the pressure at which the concentration of ozone in the carrier gas flowing out from the tower will be 20% by weight so as to desorb the ozone from the silica gel, (4) introducing oxygen into the deozonized adsorption towers one after another from one of the towers which has completed adsorption so as to purge away the carrier gas from the deozonized adsorption tower and a line extending therefrom, and (5) contacting the ozone-containing carrier gas discharged from the adsorption towers with the water to be treated.

Our researches have revealed that when an ozone-containing gas prepared by an ozone generator from a gas having a higher oxygen content than air is supplied at atmospheric or elevated pressure to an adsorption tower packed with silica gel, ozone is selectively adsorbed by the silica gel in preference to the other gas components and is thereafter desorbable by a carrier gas fed to the adsorption tower at a pressure lower than the pressure applied for the adsorption to give a gas having a higher ozone concentration than the above-mentioned ozone-containing gas. When the ozone-containing carrier gas is brought into contact with the water to be treated, the water absorbs an increased amount of ozone and can be thereby treated with a greatly improved efficiency. The gas from which the ozone is removed by absorption is recycled to the ozone generator and is reused as a portion of the starting material, whereby ozone can be prepared inexpensively and efficiently without wasting oxygen. However, if a gas having a high oxygen concentration, such as part of the starting material, is fed to the adsorption tower before the initiation of ozone adsorption to purge the tower of the remaining carrier gas after the desorption of ozone, the high oxygen consumption required renders the method infeasible for water treatment on an industrial scale. Accordingly, further researches have been carried out employing three to four adsorption towers, such that in order to purge one tower of the carrier gas after the desorption step which tower is at a reduced pressure, a portion of oxygen-containing gas in another tower of a higher pressure is used, whereby the oxygen consumption can be materially reduced. Based on these findings, this invention has been accomplished to provide, for the first time, a method of treating water on an industrial scale, free of the drawbacks theretofore experienced.

The oxygen to be used as a material gas for producing ozone preferably has a concentration of at least 80% by volume and may contain an inert gas such as nitrogen, argon, helium, carbon dioxide, etc., in a concentration of not higher than 20% by volume. However, to reduce the power consumption, to improve ozone generation efficiency and to permit use of a small ozone generator, the material gas is preferably as high as possible in its concentration of oxygen. The ozone generator may be any of conventional ozone generators of the silent electric discharge type, ultraviolet irradiation type etc., among which the silent electric discharge generator is especially advantageous to use. The generator is usually maintained approximately at room temperature and operated at a voltage of about 7,000 to 15,000 V. The ozone generator may preferably be of a low temperature, inasmuch as the lower the temperature, the higher will be ozone generating efficiency as already known. For instance, it is possible to obtain liquefied ozone with a higher yield when liquefied gas is used as the material. The internal pressure of ozone generator is generally in the range of atmospheric pressure to about 5 atms.

It is preferable that the silica gel packed in an adsorption tower to adsorb ozone be as high as possible in purity free of heavy metals which decompose ozone, but it may contain a heavy metal in an amount of up to 1.0% by weight, more advantageously not higher than 0.6% by weight. Such heavy metals include, for example, iron, manganese, chromium, copper, lead or the like that has a specific gravity of at least 5. As the temperature within the adsorption tower decreases, the amount of adsorbed ozone per unit amount of silica gel increases, and at temperatures below $-180°$ C. not only ozone but also oxygen gets adsorbed in an increased amount. Further at temperatures below about $-183°$ C. oxygen undergoes condensation, permitting ozone to dissolve into liquid oxygen, with the result that effective separation of ozone from oxygen can not be achieved, making it impossible to obtain ozone in a high concentration. On the other hand, if the temperature within the adsorption tower exceeds 10° C., ozone tends to decompose to oxygen, hence inappropriate. Thus, the temperature within the adsorption tower is in the range of $-180°$ C. to 10° C., preferably $-5°$ to $-80°$ C.

When the ozone-containing gas comes into contact with silica gel, the silica gel adsorbs ozone selectively. Consequently, the amount of ozone adsorbed by the silica gel progressively increases and finally reaches a break-through point. Preferably when the break-through point is reached or immediately therebefore or thereafter, the supply of the ozone-containing gas from the ozone generator is switched to another adsorption tower to continue adsorption of ozone in the same manner. The gas released from the adsorption tower is substantially free from ozone and contains a fairly great amount of oxygen insofar as the silica gel continues to adsorb ozone, so that the gas is returned to the ozone generator for use as part of material for generating ozone. The adsorption tower cut off from the supply of the ozone-containing gas when the break-through point is reached is then fed with a carrier gas that is at a pressure not higher than the pressure applied for the adsorption of ozone and substantially unreactive with ozone to desorb ozone from silica gel. The ozone-containing carrier gas is then brought into contact with water. Examples of the carrier gas are those substantially unreactive with ozone, for example, air, nitrogen, argon and carbon dioxide, among which air is especially advantageous to use. To render the silica gel free from condensation of water within the adsorption tower, the carrier gas is preferably dried prior to the feed thereof into the adsorption tower. Further prior to the introduction into the adsorption tower the carrier gas is advantageously cooled approximately to the temperature within adsorption tower by heat exchange, adiabatic expansion or like known method so as to avoid a marked change in the temperature within the adsorption tower. The pressure of the carrier gas within the adsorption tower should not be higher than the pressure of the ozone-containing gas during adsorption, because the lower the pressure of the carrier gas within the adsorption tower, the higher will be the concentration of ozone in the carrier gas flowing out from the tower, hence an improved water treating efficiency. Further under conditions permitting continuous operation, the lower the pressure of the carrier gas, the smaller will be the flow rate of the carrier gas, reducing the purification cost, dewatering cost, supply cost and material cost of the carrier gas, treating cost of waste gas, etc. However, as the concentration of ozone increases in gaseous phase, the hazard of explosion also increases. Our researches indicate that there will substantially be no hazard of explosion if the concentration of ozone in the carrier gas is maintained at a level not higher than 20% by weight. Accordingly, the carrier gas may preferably have the lowest possible pressure within the adsorption tower, but the pressure should preferably at least be such that the concentration of ozone in the carrier gas flowing out from the tower will not be higher than 20% by weight. The carrier gas from the adsorption tower has a constant ozone concentration for a period of time after initiation of desorption but the concentration thereafter starts to decrease to reach zero finally. The supply of carrier gas is therefore switched to the next adsorption tower to keep the water treating ability as constant as possible at least before the ozone concentration in the carrier gas reaches zero, preferably when or immediately before or after the ozone concentration starts to decrease.

Within the adsorption tower wherein the silica gel has been deozonized and within a duct for the carrier gas, the carrier gas remains, which will be mixed with recycling gas from the adsorption tower to the ozone generator if the gas from the generator is supplied to the adsorption tower immediately after the termination of the supply of carrier gas. Consequently, the concentration of oxygen in the gas within the ozone generator will be progressively reduced, or water and like impurities will accumulate progressively in the recycling gas to such an extent as to lower the ozone generating efficiency.

In this case, a greater oxygen loss will result, if the ozone generating material gas is fed to the deozonized adsorption tower and carrier gas duct to purge them of the carrier gas. In order to avoid the accumulation of impurities in the recycling gas and oxygen loss, a portion of ozone-containing gas retained at an elevated pressure in another adsorption tower which has completed adsorption is supplied to the completely deozonized tower before the supply of carrier gas is switched to the next adsorption tower. In this way, the carrier gas remaining in the adsorption tower and duct can be driven off therefrom.

The desorbed ozone is supplied to water by any of known gas-liquid contact methods such as injection, diffusion, agitation, etc. When the desorption is effected below the atmospheric pressure, ozone-containing carrier gas is sucked from the adsorption tower with a jet pump, ejector, etc., into a water treatment tank wherein the gas is contacted by injection with the water to be treated.

This invention will be described below in greater detail with reference to drawings.

Figure 2:
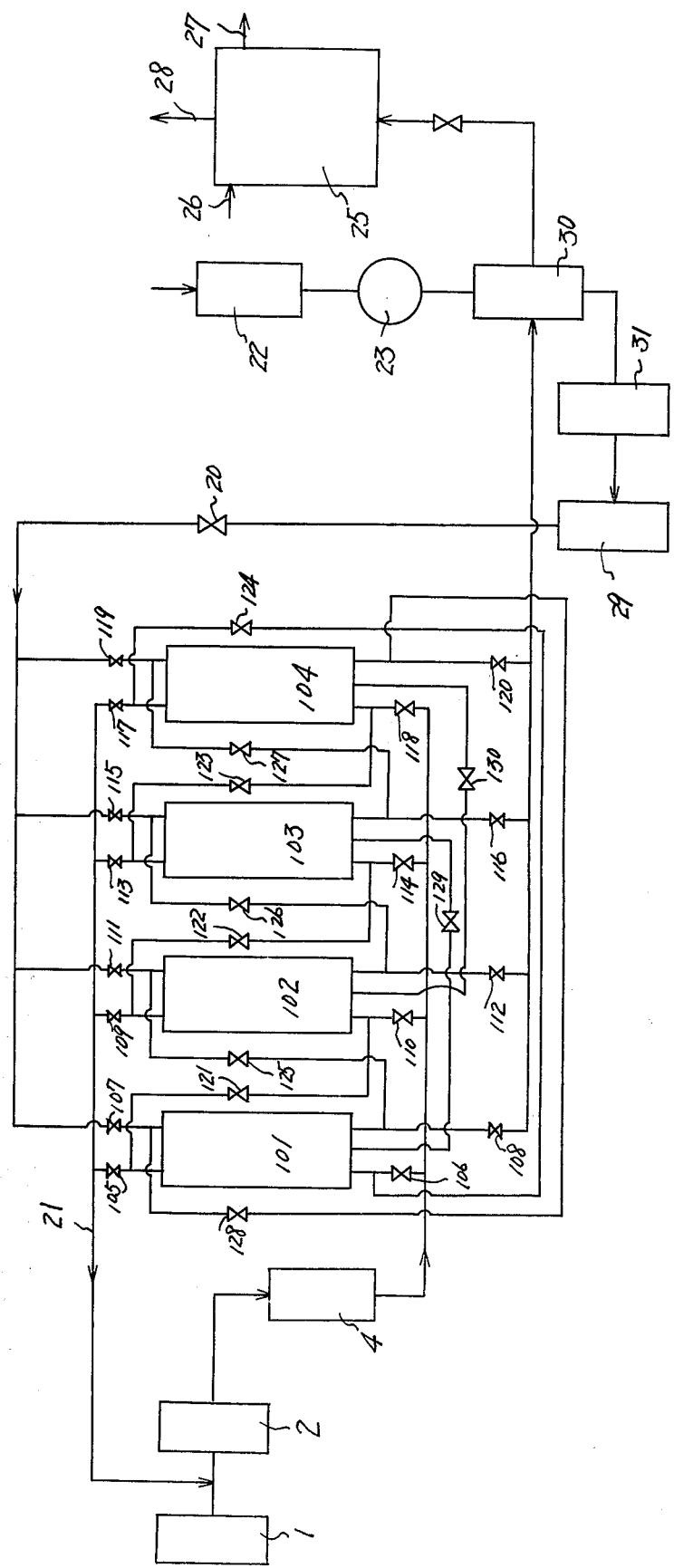

FIG. 1 is a flow chart illustrating a method of this invention in which three adsorption towers are used; and FIG. 2 is a flow chart illustrating a method of this invention in which four adsorption towers are used.

FIG. 1 presents a flow chart of water treating method employing three adsorption towers 5, 6 and 7. It is assumed that initially the first adsorption tower 5 is operated for adsorption, the second adsorption tower 6 is in operation for desorption and the third adsorption tower 7 is out of operation. The valves 8, 9 of the first adsorption tower 5, valves 16, 17 of the second adsorption tower 6 and valve 20 for carrier gas are open, whilst the other valves are closed. A material for producing ozone (hereinafter referred to as "oxygen") is sent from a supply source 1 to an ozone generator 2 for example of the silent electric discharge type, in which part of the oxygen is converted to ozone. Usually, the ozone generator is maintained approximately at room temperature by cooling with water or air, but if liquid oxygen is used as the material, the ozone generator produces ozone efficiently at a low temperature while being thereby cooled. In the case where the ozone generator is maintained approximately at room temperature, the ozone-containing oxygen from the generator 2 should be cooled to a temperature of $-180°$ to $10°$ C. before it is sent through the open switch valve 8 to the first adsorption tower 5 which is packed with silica gel and maintained at the specified temperature by a suitable cooling means (not shown). It is advantageous to cool the ozone-containing oxygen by a cooler 4. In the first adsorption tower 5, the ozone in the ozone-containing oxygen is selectively adsorbed by silica gel, while the remaining oxygen is recovered and passed through the open switch valve 9 and a recycling line 21 back to the ozone generator 2. When the ozone-containing oxygen is continuously supplied to the first adsorption tower 5, the ozone in the ozone-containing oxygen is almost wholly adsorbed by the silica gel within a period of time, with substantially no ozone contained in the gas flowing out from the tower 5, although the result may differ depending on the flow rate of the ozone-containing oxygen and the amount of silica gel used. However, after the break-through point has been reached, the concentration of ozone in the gas running out from the tower starts to increase progressively and finally equals that of the ozone-containing oxygen supplied to the adsorption tower.

When or before or after the ozone concentration substantially starts to increase, the switch valves 12, 13 of the third adsorption tower 7 are opened and the valves 8, 9 of the first adsorption tower 5 are closed to switch the supply of the ozone-containing oxygen. In this stage, the first adsorption tower 5 has completed adsorption, whilst the third adsorption tower 7 starts adsorption. The valve 20 is thereafter closed to discontinue the inflow of the carrier gas into the second adsorption tower 6. In this state, the first tower 5 is at elevated pressure and the second tower 6 at a reduced pressure. Upon opening a valve 14, the oxygen retained in the first tower flows through the valves 14 and 16 into the second tower 6 due to the pressure difference, progressively forcing out the carrier gas via the valve 17. When the system is allowed to stand in this state for a specified period of time, the carrier gas is completely purged away from the second tower 6 and the line extending therefrom. Subsequently, the valve 15 of the first tower 5 is opened, the valves 16, 17 of the second tower 6 are closed, and the carrier gas valve 20 is opened, whereupon the carrier gas is sent from its supply source 22 through a blower 23 and the valve 20 to the first tower 5 to bring the first tower into deozonizing operation. At this time, the valve 11 of the second tower 6 is opened, whereby part of the oxygen recycled from the third tower 7 to the ozone generator 2 by way of the valve 13 and line 21 is introduced into the second tower 6 to an elevated pressure. The valve 11 is then closed to bring the second tower 6 out of operation. The ozone-containing carrier gas flows through the valve 15 and line 24 into a water treating tank 25 for contact with the water to be treated. It is advantageous to feed the ozone-containing carrier gas to the treating tank 25 while supplying the water thereto via a line 26 to ensure the contact between the ozone and water to the greatest possible extent and to thereafter run off the treated water via another line 27. The carrier gas contacted with the water is drawn off by way of an outlet line 28. When desired for the prevention of condensation of water within the adsorption towers, the carrier gas to be supplied to the towers can be dewatered by a dewatering unit 29 to below a predetermined humidity, then subjected in a heat exchanger 30 to heat exchange with the ozone-containing carrier gas from the adsorption tower and thereafter cooled by a cooler 31 to a specified temperature of between $-180°$ to $10°$ C. For a certain period of time after the commencement of supply of the carrier gas to the first adsorption tower 5, the carrier gas flowing out from the adsorption tower has an approximately constant ozone concentration, which however thereafter starts to decrease and finally reaches zero. Accordingly, when the ozone concentration starts to decrease or immediately therebefore or thereafter, valves are operated in a similar manner to the above to bring the first tower out of operation, the second tower into condition for adsorption and the third tower into condition for desorption so as to effect adsorption of ozone and water treatment without interruption.

FIG. 2 is a flow chart illustrating a water treating method in which four adsorption towers 101, 102, 103 and 104 are used. The ozone generating system and water treating system shown are substantially the same as those illustrated in FIG. 1. Throughout FIGS. 1 and 2, like components are referred to by like numerals. It is assumed that adsorption towers 101, 102 are in operation for adsorption and towers 103, 104 are in desorbing operation. Valves 106, 121, 109, 115, 127, 120 and 20 are open. An ozone-containing gas is sent through the valve 106 to the tower 101 and then through the valve 121 to the tower 102. The deozonized oxygen is recycled to an ozone generator 2 by way of a valve 109 and a line 21. A deozonizing carrier gas is introduced through the valves 20 and 115 into the tower 103 and then through the valve 127 into the tower 104. Along with the ozone desorbed from the towers 103 and 104, the gas is then admitted into a water treating tank 25 via the valve 120. After the completion of adsorption of ozone in the tower 101 and after the completion of desorption of ozone in the tower 103, the towers 102, 103 are brought into adsorption operation and towers 104, 101 into desorption operation by switching valves in the following manner. First, a valve 110 is opened and, at the same time, the valves 106, 121 are closed, whereby the ozone-containing gas which has been led to the tower 102 via the tower 101 is directly admitted into the tower 102 through the valve 110, leaving the tower 101 out of the adsorption operation. Simultaneously with this, a valve 119 is opened and the valve 127 is closed, permitting the carrier gas to pass through the tower 104 alone via the valves 20, 119 to terminate the desorption operation in the tower 103. Next, the valve 20 is closed to stop the inflow of carrier gas, and a valve 129 is opened, allowing the oxygen gas to flow from the adsorption tower 101 of a higher pressure containing adsorbed ozone to the deozonized adsorption tower 103 of a lower pressure, whereby the carrier gas remaining in the adsorption tower 103 is forced through the valves 115, 119, tower 104 and valve 120 into the water treating system. Subsequently, the valves 115, 129 are closed, the valves 20, 108, 128 are opened, and the valve 120 is closed. Consequently, the carrier gas flows through the valves 20, 119 into the tower 104, then through the valve 128 into the tower 101, from which the ozone-containing gas flows through the valve 108 into the water treating system. The towers 104, 101 are now in operation for desorption. While the valves are being operated to bring the towers 104 and 101 into desorption operation, valves 113, 122 are opened, and the valve 109 is closed, whereby the ozone-containing gas from the generator is led through the valve 110 into the tower 102, from which the gas is passed through the valve 122 into the tower 103. The deozonized oxygen is recycled from the tower 103 through the valve 113 into the generator 2. In this way, the towers 102, 103 are operated for adsorption. The method employing four adsorption towers, although entailing an increase in equipment cost, has the advantages of achieving an improved water treating efficiency and greatly reducing oxygen losses.

Both the apparatus of FIGS. 1 and 2 can of course be adapted for sequence control based on a predetermined program in conformity with the capacity of ozone generator, the ozone adsorbing capacity of adsorption towers, the quantity of water to be treated, etc.

To clarify the features of this invention, examples are given below wherein number of common bacteria was determined by observation with a microscope and manganese content was determined in accordance with the periodate method described in "Standard methods for the examination of water, sewage and industrial waste", (1955), P137.

EXAMPLE 1

With reference to the flow chart of FIG. 1, oxygen having a purity of 99.5% by volume was supplied from a cylinder 1 to an ozonizer 2 to produce ozone. The ozonizer 2 was of the water-cooled, silent electric discharge type comprising an inner glass cylinder and an outer stainless steel cylinder and capable of producing ozone at 100 g/h. The ozone obtained from the ozonizer 2 was supplied to adsorption towers 5, 6 and 7, in which adsorption, desorption and layoff were conducted alternately under the conditions given in Tables 1 and 2. The ozone conveyed by carrier gas was then, under the conditions as shown in Table 3, brought into contact with water processed by sedimentation and filtration and having various properties shown in Table 4. The results are listed in Table 4 below.

Table 1

| Process No. | 1 | 2 | 3 |
|---|---|---|---|
| Temperature within adsorption tower (° C) | −70 | −40 | −10 |
| Amount of silica gel packed in adsorption tower (g) | 700 | 1,700 | 3,500 |
| Amount of ozone fed to adsorption tower (g/hr) | 100 | 100 | 100 |
| Adsorption pressure (kg/cm$^2$A) | 1.5 | 1.5 | 1.5 |
| Ozone concentration in ozone-containing oxygen (wt. %) | 3.0 | 3.0 | 3.0 |
| Adsorption time (min.) | 15 | 10 | 5 |
| Temperature of ozone-containing oxygen at adsorption tower inlet (° C) | −70 | −40 | −10 |

Table 2

| Process No. | 1 | 2 | 3 |
|---|---|---|---|
| Water content in carrier gas (g/Nm$^3$)* | 0.002 | 0.08 | 0.30 |
| Temperature of carrier gas at adsorption tower outlet (° C) | −70 | −40 | −10 |
| Desorption pressure (kg/cm$^2$A) | 1.5 | 1.5 | 1.5 |
| Desorption time (min.) | 15 | 10 | 5 |
| Concentration of ozone in carrier gas at adsorption tower outlet (%) | 3.0 | 3.0 | 3.0 |

Note:
*Air dewatered at an increased pressure of 10 kg/cm$^2$ was used as the carrier gas.

Table 3

| Process No. | 1 | 2 | 3 |
|---|---|---|---|
| Method of contact between water and ozone-conveying carrier gas | Injection through diffuser | Injection through diffuser | Injection through diffuser |
| Amount of ozone injected (g/ton.water) | 2 | 2 | 2 |
| Amount of water treated (tons/hr) | 50 | 50 | 50 |
| Ozone absorption rate (%) | 80 | 80 | 80 |

Table 4

| | Quality of water | | | |
|---|---|---|---|---|
| | Before | After treatment | | |
| Process No. | treatment | 1 | 2 | 3 |
| Musty smell caused by GEOSMIN | Yes | None | None | None |
| Number of common bacteria | 215 n/cc | 0 | 0 | 0 |
| Manganese content | 1.1 p.p.m. | Up to 0.02 p.p.m. | Up to 0.02 p.p.m. | Up to 0.02 p.p.m. |

EXAMPLE 2

Using the system shown in the flow chart of FIG. 1, water processed by a secondary treatment for water supply was treated. Oxygen having a purity of 99.0% by volume was supplied from a cylinder 1 to an ozonizer 2 similar to one used in Example 1 to produce ozone, which was subjected alternately to adsorption under the conditions listed in Table 5 below and to desorption and pause under the conditions given in Table 6, using adsorption towers 5, 6 and 7. The ozone conveyed by air was then continuously brought into contact, under the conditions given in Table 7, with the water processed by secondary treatment and sent into a treatment tank 25, the water having various properties shown in Table 8.

Table 5

| Process No. | 4 | 5 | 6 |
|---|---|---|---|
| Temperature within adsorption tower (° C) | −70 | −50 | −20 |
| Amount of silica gel packed in adsorption tower (g) | 1,500 | 2,200 | 3,500 |
| Amount of ozone fed to adsorption tower (g/hr) | 200 | 200 | 200 |
| Adsorption pressure (kg/cm²A) | 1.5 | 1.5 | 1.5 |
| Ozone concentration in ozone-containing oxygen (wt. %) | 2.0 | 2.0 | 2.0 |
| Adsorption time (min.) | 30 | 20 | 10 |
| Temperature of ozone-containing oxygen at adsorption tower inlet (° C) | −70 | −50 | −20 |

Table 6

| Process No. | 4 | 5 | 6 |
|---|---|---|---|
| Water content in carrier gas (g/Nm³) | 0.003 | 0.03 | 0.9 |
| Temperature of carrier gas at adsorption tower outlet (° C) | −70 | −50 | −20 |
| Desorption pressure (kg/cm²A) | 0.5 | 0.7 | 0.8 |
| Desorption time (min.) | 15 | 10 | 7 |
| Concentration of ozone in carrier gas at adsorption tower outlet (%) | 5.6 | 4.4 | 4.0 |

Table 7

| Process No. | 4 | 5 | 6 |
|---|---|---|---|
| Method of contact between water and ozone-conveying carrier gas | Injection by ejector | Injection by ejector | Injection by ejector |
| Amount of ozone injected (g/ton . water) | 2.0 | 2.0 | 2.0 |
| Amount of water treated (tons/hr) | 100 | 100 | 100 |
| Ozone absorption rate (%) | 96 | 92 | 90 |

Table 8

| | Quality of water | | | |
|---|---|---|---|---|
| | Before | After treatment | | |
| Process No. | treatment | 4 | 5 | 6 |
| Musty smell caused by GEOSMIN | Yes | None | None | None |
| Number of common bacteria | 285 n/cc | 0 | 0 | 0 |
| Manganese content | 1.3 p.p.m. | Up to 0.02 p.p.m. | Up to 0.02 p.p.m. | Up to 0.02 p.p.m. |

EXAMPLE 3

Secondary sewage treatment was conducted by activated sludge process, followed by separation of sludge to obtain processed sewage having BOD of 36 mg/l, a faint sewage smell and slight turbidity, which was treated with ozone by the system shown in the flow chart of FIG. 1. Odorless and clear water having BOD of 6 mg/l and resembling drinking water was obtained. The ozone was produced from oxygen having a concentration of 100% by volume. Treating conditions are given in Tables 9 to 11 below.

Table 9

| Process No. | 7 |
|---|---|
| Temperature within adsorption tower ° C) | −30 |
| Amount of silica gel packed in adsorption tower (g) | 3,000 |
| Amount of ozone fed to adsorption tower (g/hr) | 200 |
| Adsorption pressure (kg/cm²A) | 1.2 |
| Ozone concentration in ozone-containing oxygen (wt. %) | 1.7 |
| Adsorption time (min.) | 5 |

Table 10

| Process No. | 7 |
|---|---|
| Water content in air as carrier gas (g/Nm³) | 0.4 |
| Desorption pressure (kg/cm²A) | 0.8 |
| Desorption time (min.) | 5 |
| Concentration of ozone in carrier gas at adsorption tower outlet (%) | 2.7 |

Table 11

| Process No. | 7 |
|---|---|
| Method of contact between water and ozone-conveying carrier gas | Injection through diffuser |
| Amount of ozone injected (g/ton.water) | 100 |
| Amount of water treated (tons/hr) | 2 |
| Ozone absorption rate (%) | 89 |

EXAMPLE 4

Secondary sewage treatment was conducted by activated sludge process, followed by separation of sludge to obtain processed sewage having BOD of 33 mg/l, a faint sewage smell and slight turbidity, which was treated with ozone by the system shown in the flow chart of FIG. 1. This gave odorless clear water having BOD of 5 mg/l and resembling drinking water. The ozone was produced from oxygen having a concentration of 80% by volume. The treating conditions are listed in Tables 12 to 14.

Table 12

| Process No. | 8 |
| --- | --- |
| Temperature within adsorption tower (° C) | −30 |
| Amount of silica gel packed in adsorption tower (g) | 8,000 |
| Amount of ozone fed to adsorption tower (g/hr) | 100 |
| Adsorption pressure (kg/cm$^2$A) | 2.0 |
| Ozone concentration in ozone-containing oxygen (wt. %) | 2.0 |

Table 13

| Process No. | 8 |
| --- | --- |
| Water content in carrier gas (g/Nm$^3$) | 0.4 |
| Desorption pressure (kg/cm$^2$A) | 0.8 |
| Concentration of ozone in carrier gas at adsorption tower outlet (%) | 4.6 |

Table 14

| Process No. | 8 |
| --- | --- |
| Method of contact between water and ozone-conveying carrier gas | Injection by ejector |
| Amount of ozone injected (g/ton.water) | 50 |

Table 14-continued

| Process No. | 8 |
| --- | --- |
| Amount of water treated (tons/hr) | 2 |
| Ozone absorption rate (%) | 90 |

What we claim is:

1. In a method of treating water with ozone comprising generating ozone from oxygen by an ozone generator, supplying the resulting ozone-containing gas to at least three silica gel-packed adsorption towers one after another to cause the silica gel to adsorb ozone selectively from the gas while recycling discharged gas from the adsorption tower to the ozone generator, supplying a carrier gas for desirbing the ozone from the silica gel to the adsorbed ozone-containing adsorption towers one after another and contacting the ozone-containing carrier gas discharged from the adsorption towers with the water in the water treating tank so as to cause the ozone to react with the water, an improvement which comprises (i) switching the supply of carrier gas to the adsorption towers one after another from one to another when or immediately before or immediately after the ozone concentration in the carrier gas discharged from the adsorption tower starts to decrease so as to keep the water treating ability as constant as possible with a substantially constant ozone concentration and (ii) introducing oxygen into the adsorption towers to which the supply of carrier gas has been terminated one after another from one of the towers which has completed adsorption so as to purge away the carrier gas containing ozone from the adsorption tower and from a line extending therefrom into a water treating tank without venting the same to the atmosphere and so as to avoid the accumulation of impurities in the recycling gas and the contamination of the atmosphere.

* * * * *